Nov. 11, 1958  A. N. STRICKLAND ET AL  2,860,321
TIRE ALARM
Filed Dec. 21, 1955  2 Sheets-Sheet 1

INVENTORS.
ALBERT N. STRICKLAND.
BERNARD B. KING.
BY
Lockwood, Galt, Woodard + Smith
ATTORNEYS.

Nov. 11, 1958   A. N. STRICKLAND ET AL   2,860,321
TIRE ALARM
Filed Dec. 21, 1955   2 Sheets-Sheet 2
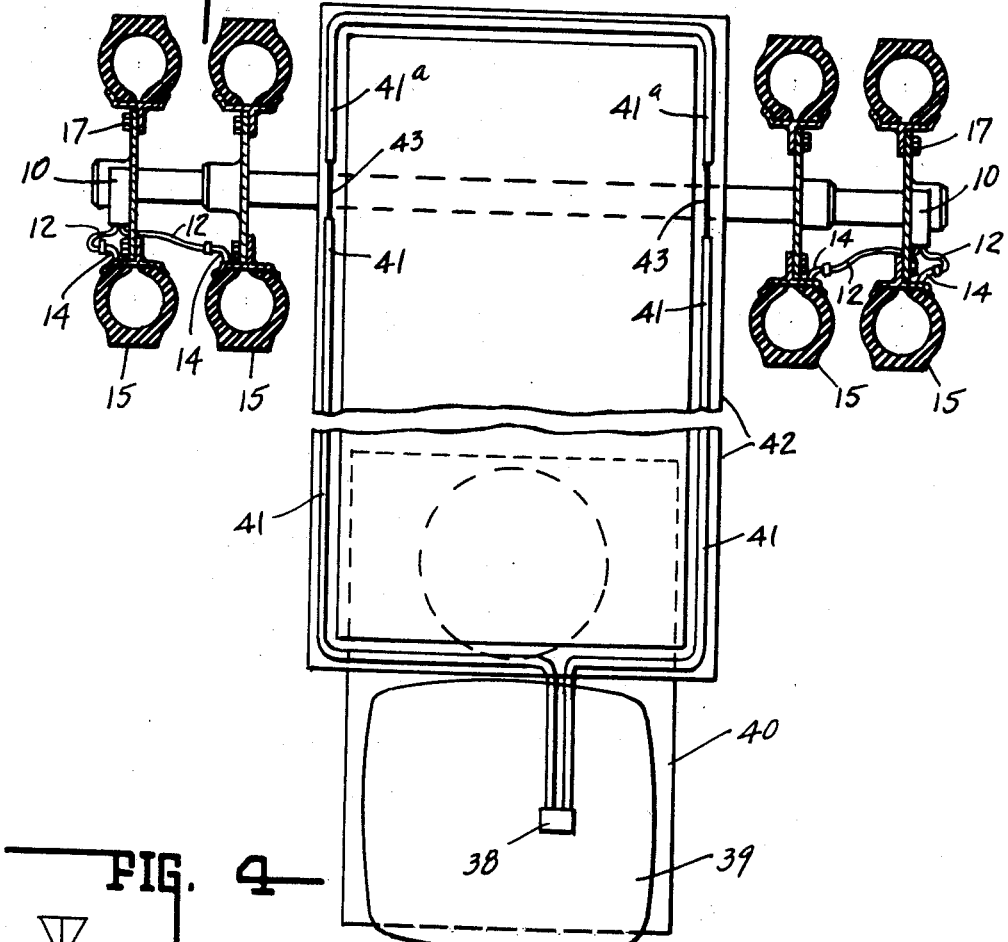
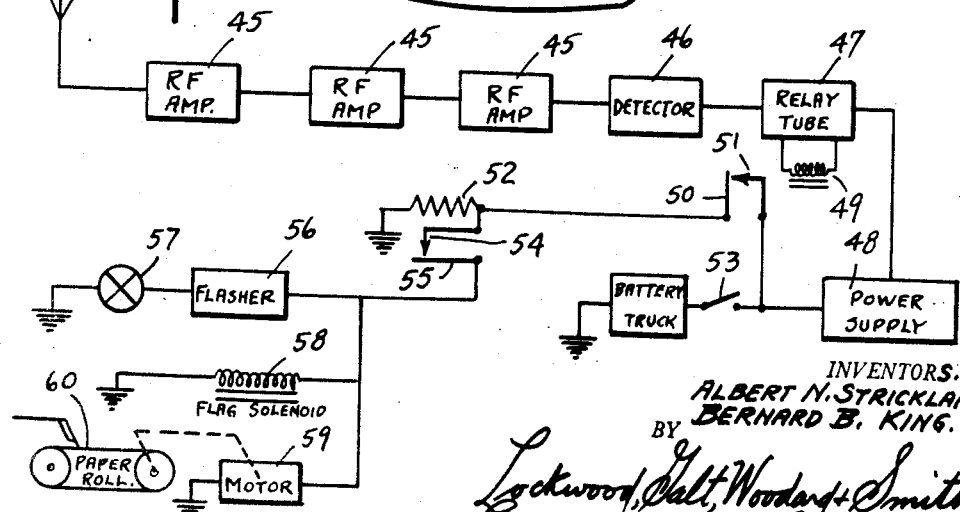
INVENTORS.
ALBERT N. STRICKLAND,
BERNARD B. KING.
BY
Lockwood, Galt, Woodard & Smith
ATTORNEYS.

United States Patent Office 2,860,321
Patented Nov. 11, 1958

2,860,321

TIRE ALARM

Albert N. Strickland and Bernard B. King, Indianapolis, Ind., assignors, by direct and mesne assignments, to Raymond James Stockholm, Indianapolis, Ind.

Application December 21, 1955, Serial No. 554,535

10 Claims. (Cl. 340—58)

This invention relates generally to alarm devices, and more particularly to tire alarm systems adapted to provide the driver of an automobile truck with warning of over-inflation or under-inflation of his tires.

Proper inflation of truck tires is important in order to prevent excessive wear of the tires and to prevent the occurrence of blowouts or the starting of a fire which may destroy the truck. If a heavily loaded truck has a tire within which the pressure is a few pounds under the normal pressure, the tire will wear excessively and may generate sufficient heat within itself to destroy itself. Abnormally low pressure can also cause a tire to generate enough heat to ignite itself, and without some sort of warning the truck driver may proceed along his way for a long enough period to endanger his truck of fire. Over-inflation of tires can occur due to high ambient temperatures, and this can result in excessive wear or blowouts.

The principal object of this invention is to provide an alarm system responsive to abnormal pressure in a pneumatic tire to initiate an alarm in the cab of an automotive vehicle.

Another object of this invention is to provide an alarm system responsive to abnormal pressures in truck tires for initiating an alarm, which system does not require any physical connection between the rotating wheel and the other structure of the truck.

Still another object of this invention is to provide a radio alarm system adapted to provide an alarm in response to abnormal pressures in a truck tire.

A further object of this invention is to provide a radio transmitter adapted to be attached to the hub of a truck wheel, which transmitter is responsive to abnormal pressures in a tire mounted on said wheel to transmit an alarm signal.

A still further object of this invention is to provide an alarm system responsive to abnormal pressure in a truck tire to initiate a visible signal and a permanent indication of said signal, said system including means for permitting inflation of a truck tire without initiating any of said signals.

In accordance with this invention there is provided an alarm system adapted to initiate an alarm in response to abnormal pressures in a truck tire, which system includes a radio transmitter mounted on the hub of a truck wheel, a radio receiver mounted in the cab of a truck, and a receiving antenna extending from said cab into immediate proximity of the wheels of the truck whereby signals may be transferred from said transmitter to said receiver without any physical connection between said receiver and transmitter.

Also in accordance with this invention there is provided a radio transmitter adapted to be mounted on the hub of a truck wheel and including switch means responsive to the air pressure within a tire on said wheel to initiate transmission of a signal in response to abnormal pressures within said tire.

Further in accordance with this invention there is provided a radio receiver for trucks responsive to a received signal for initiating a visible alarm and a permanent indication of said signal.

The full nature of the invention will be understood from the accompanying drawings and the following description and claims:

Fig. 3 is a schematic drawing illustrating the application of this invention to a conventional automobile truck.

Fig. 4 is a circuit diagram of a radio receiver adapted to be used in the system of this invention.

Figure 1:
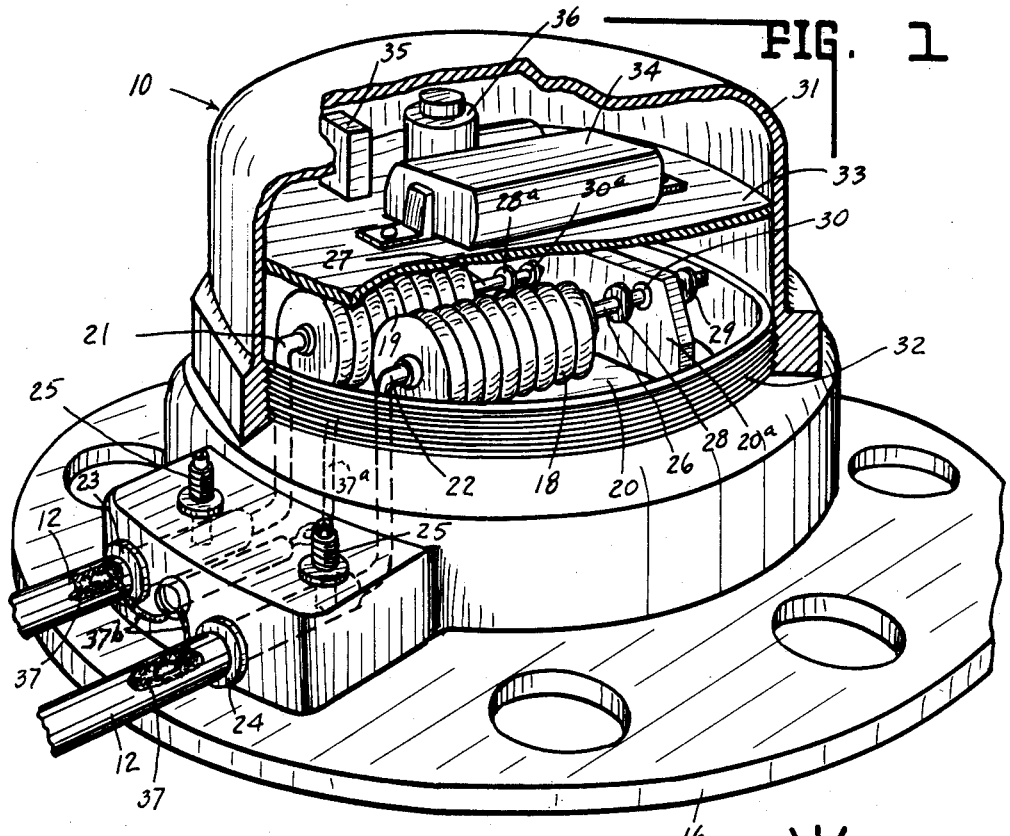
Fig. 1 is a perspective view, with parts broken away, of a radio transmitter and wheel hub mounting adapted to be used in the system of this invention.

Referring to the drawings, there is provided in accordance with this invention a radio transmitter 10 for each truck wheel having hose connections 12 adapted to be connected to the conventional air inflation valves 14 of the truck tires 15. Transmitter 10 includes a housing 16 adapted to be fastened to the hub portion of a truck wheel by means of conventional lug bolts 17.

A pair of pressure responsive bellows 18 and 19 may be mounted in any suitable fashion on a shelf 20 forming an integral part of the housing 16. The bellows 18 and 19 are connected respectively by means of tubes 21 and 22 to hose receiving fittings 23, 24, respectively, into which may be connected hoses 12, which hoses may be connected to the tire valves as previously explained. In order to provide facilities for inflating the tires 15, a pair of conventional valve stems 25 may be mounted in the housing 16 and connected with the tubes 21, 22, valve stems 25 including conventional valve cores such as those used in automobile valve stems.

The bellows 18 and 19 may be connected to shafts 26, 27 each carrying spaced contacts such as 28 and 29. A stationary contact 30 in the form of a bushing may be mounted on member 20a to receive the shaft 26 for sliding movement, whereby the bellows 18 may move shaft 26 and its contact 28 or contact 29 into pressure contact with the stationary contact 30. It will be understood that shaft 27 has an electrical contact arrangement identical to that of shaft 26 for cooperating with a fixed contact 30a similar in all respects to contact 30. Thus, excessive pressure in one of the tires will actuate its associated bellows to move contact 28 into engagement with contact 30, whereas low pressure in a tire will actuate the bellows 18 to move contact 29 into engagement with stationary contact 30.

A housing cap 31 may be mounted on the housing 16 by means of the threaded flange 32, the housing 31 including therein a shelf 33 disposed over bellows 18, 19. A transmitter battery 34 and other transmitter components, such as a transistor 35 and a coil 36, may be mounted on the shelf 33 and secured thereto by conventional anchoring means. It will be understood that a simple, conventional, limited range, radio transmitter may be mounted on the shelf 33 even though all of the components thereof may not be shown in the drawings. In order to provide an antenna for the transmitter 10 which will provide sufficient radiation, but which will not add any unsafe extensions to the truck wheel, the hose 12 may be conventional hose having a metallic sheath 37. The antenna circuit of transmitter 10 may be coupled to sheath 37 by means of conductors 37a and 37b.

Figure 2:
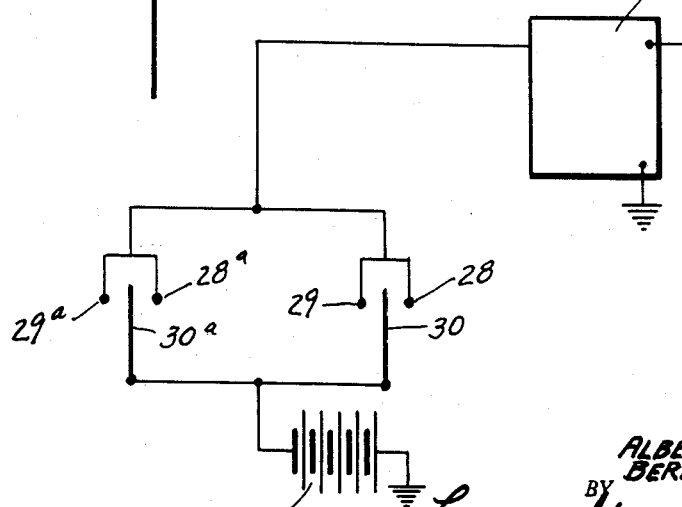
Fig. 2 is a circuit diagram of the transmitter illustrated in Fig. 1.

Reference may be had to Fig. 2 for a schematic illustration of a radio transmitter wherein the battery 34 is connected to ground and switches 28, 29, 30 and switches 28a, 29a, 30a are connected in parallel between battery 34 and the transmitter 10, whereby under-inflation or over-inflation of one of the tires 15 will cause the transmitter 10 to be energized and to transmit a signal. For example, transmitter 10 may be designed to radiate a signal wave having a frequency of approximately 450 kilocycles whenever one of the switches 28, 29, 30 is actuated. It will be understood that these switches are normally open when the pressure in the tires 15 is normal. For example, truck tires, depending upon their size, carry pressures of sixty-five pounds to ninety-five pounds, and the system as provided in accordance with this invention may be adjusted to operate on a variation of pressure of plus or minus twelve pounds.

Referring to Fig. 3, a radio receiver 38 may be mounted in the cab 39 of a tractor 40, for example. An antenna 41 may be disposed around the lower edge of a trailer 42, the antenna being shielded as at 41a except at the portions 43 immediately adjacent to each of the truck wheels. By shielding a major portion of the antenna, the reception of extraneous radio wave energy may be reduced to a minmum, and the effective range of the transmitter 10 may also be reduced to such an extent that transmission may be so limited as to cover a small field encompassing the transmitter and the exposed portions 43 of the antenna.

Receiver 38 may be a conventional radio receiver such as that illustrated schematically in Fig. 4. The receiver may comprise a plurality of radio frequency amplifiers 45, a detector 46, a relay tube 47 and a power supply 48. Relay tube 47 serves to energize electromagnetic relay 49, the contacts 50 and 51 of which are connected to a thermal delay relay 52 and the truck ignition switch 53, respectively. Thermal delay relay 52 may be arranged to close within approximately two seconds after it is energized by relay 49, thereby to provide a delay which will serve to eliminate spurious signals of relatively short duration which may be received from sources other than the transmitter 10. Spurious signals may also occur due to momentary changes in pressure within the tires 15, but if such changes are only momentary, no indication should be provided in the cab of the truck. Delay relay 52 also serves to prevent spurious signals which might result when a momentary change in pressure occurs within the bellows 18 and 19 during the attachment of a tire inflation hose to the valve 25. By coupling the radio receiver to ignition switch 53, the alarm system must be operative whenever the truck is operated. Normally the truck ignition switch 53 may be opened when it is desired to add air to the truck tires, but if the service man were to unwittingly attach a host to the valve 25, the resulting pressure change would not be effective to indicate a false change of pressure within the tires because contacts 54, 55 of relay 52 would not have closed.

The contacts 54 and 55 of relay 52 may be connected to a parallel circuit having a flasher 56 and a signal lamp 57 in one branch, a visible flag operating solenoid 58 in another branch, and a recorder motor 59 in another branch.

Lamp 57 serves to provide a flashing signal indicative to a truck driver that the pressure in at least one of his tires is either abnormally high or abnormally low. Immediately upon receiving such a signal, or within the shortest possible time thereafter, the driver is duty bound to stop and correct the abnormal tire condition. It is found in practice, however, that some truck drivers will not obey the signal and, therefore, the flag operated by solenoid 58 may be enclosed within the radio receiver cabinet. Thus, if a driver has damaged a tire, he can not claim failure of the signal lamp because inspection of the interior of the receiver cabinet will show that the indicator flag has been operated by solenoid 58. A recorder 60 operated by the motor 59 may also be utilized to provide a record showing actuation of the signal lamp 57 and the time at which abnormal pressures occurred in the truck tires. This also serves to prevent truck drivers from neglecting to act when they receive a signal.

From the foregoing description it will be apparent that this invention provides an alarm system wherein no physical connections are required between the pressure change detecting portion of the system and the indicating device. The system provides an alarm whenever abnormally high or abnormally low pressures exist in the truck tires. However, the receiver includes delay means for preventing false alarms whenever the tires are inflated or whenever extraneous radio signals may be received from sources other than the wheel transmitters. Also, it is substantially impossible for the truck driver to defeat the alarm system because of the permanent actuation of the flag signal and/or the permanent record made in the recorder.

While the preferred embodiment of the invention has been described as including a radio receiver having certain conventional circuit components, it will be understood that various other conventional components may be substituted without departing from the spirit of the invention. For example, other delay means may be substituted for the thermal relay, and other types of signalling or recording devices may be substituted. In certain applications of this invention it may not be necessary to provide a recorder or a flag signal, but it will be readily apparent that either one or both of these devices may be utilized.

The invention claimed is:

1. A radio alarm system for initiating an alarm in an automobile truck in response to abnormal pressure in the tires of said truck, comprising radio transmitters coupled pneumatically to said tires for initiating transmission of a radio signal wave in response to abnormal pressure in said tires, a receiver antenna adjacent to said tires, a radio receiver coupled to said antenna and adapted to be mounted in the cab of said truck, a visible alarm mounted in said cab for indicating abnormal pressure in said tires, an inaccessible flag signal enclosed in said receiver for providing permanent indication of actuation of said visible alarm, a recorder for making a record of actuation of said visible alarm, a delay relay coupling said visible alarm, said flag signal and said recorder to said receiver for actuating them only in response to sustained abnormal pressure in said tires, and a power supply circuit coupled with said receiver and including an ignition switch of said truck, whereby said receiver is always operative when said truck is operative.

2. A radio alarm system for initiating an alarm in an automobile truck in response to abnormal pressure in the tires of said truck, comprising radio transmitters coupled pneumatically to said tires for initiating transmission of a radio signal wave in response to abnormal pressure in said tires, a receiver antenna adjacent to said tires, a radio receiver coupled to said antenna and adapted to be mounted in the cab of said truck, an alarm coupled to said receiver for indicating abnormal pressure in said tires, a delay relay coupling said alarm to said receiver for actuating it only in response to sustained abnormal pressure in said tires, and a power supply circuit coupled with said receiver and including an ignition switch of said truck, whereby said receiver is always operative when said truck is operative.

3. A radio alarm system for initiating an alarm in an automobile truck in response to abnormal air pressure in the tires of said truck, comprising a limited range radio transmitter adapted to be mounted on the hub of a wheel of said truck and having in circuit therewith a pressure controlled switch, an air hose connected to said switch and adapted to be connected to a tire of said wheel, whereby abnormal pressure in said tire may actuate said switch for initiating transmission of a radio signal, said air hose including a conductive sheath coupled to the antenna circuit of said transmitter to serve as an antenna for said transmitter, a radio receiver adapted to be mounted in the cab of said truck, and a shielded antenna coupled to said receiver and having unshielded portions adjacent the wheels of said truck, whereby said unshielded portions may receive signals radiated by the sheath of said hose.

4. A radio alarm system for initiating an alarm in an automobile truck in response to abnormal air pressure in the tires of said truck, comprising a radio transmitter adapted to be mounted on a wheel of said truck, an air hose adapted to be connected to a tire of said wheel, pressure controlled means coupled to said hose and to said transmitter for initiating transmission of a radio signal in response to abnormal pressure in said tire, said air hose including a conductive sheath coupled to the antenna circuit of said transmitter to serve as an antenna for said transmitter, a radio receiver adapted to be mounted in the cab of said truck, and an antenna coupled to said receiver and having portions adjacent the wheels of said truck, whereby said portions may receive signals radiated by the sheath of said hose.

5. A radio alarm system for initiating an alarm in an automobile truck in response to abnormal air pressure in the tires of said truck, comprising a radio transmitter adapted to be mounted on a wheel of said truck and having in circuit therewith a single pole, double-throw, pressure controlled switch, an air hose connected to said switch and adapted to be connected to a tire of said wheel, whereby abnormal pressure in said tire may actuate said switch for initiating transmission of a radio signal, a radio receiver adapted to be mounted in the cab of said truck, and a shielded antenna coupled to said receiver and having unshielded portions adjacent the wheels of said truck, whereby said unshielded portions may receive signals from said transmitter.

6. A radio alarm system for initiating an alarm in an automobile truck in response to abnormal air pressure in the tires of said truck comprising a radio transmitter mounted on a wheel of said truck and having in circuit therewith a pressure controlled switch, an air hose connected to said switch and adapted to be connected to a tire of said wheel, whereby abnormally high or abnormally low pressure in said tire may actuate said switch for initiating transmission of a radio signal, a radio receiver adapted to be mounted in the cab of said truck, and an antenna coupled to said receiver and having portions adjacent the wheels of said truck, whereby said portions may receive signals from said transmitter.

7. A radio alarm system for initiating an alarm in an automobile truck in response to abnormal air pressure in the tires of said truck, comprising a radio transmitter adapted to be mounted on a wheel of said truck and having in circuit therewith a pressure controlled switch, an air hose connected to said switch and adapted to be connected to a tire of said wheel, whereby abnormally high or abnormally low pressure in said tire may actuate said switch for initiating transmission of a radio signal, said air hose including a conductive sheath coupled to the antenna of said transmitter to serve as an antenna for said transmitter, and a radio receiver adapted to be mounted in the cab of said truck for receiving signals from said transmitter.

8. In combination, a truck wheel having a pneumatic tire mounted thereon, and a radio transmitter comprising a housing mounted on the hub of said wheel, a bellows mounted in said housing, a tube connecting said bellows with the exterior of said housing, a tire inflation valve coupled to said tube, an air hose connecting said tube and the air valve of said tire for subjecting said bellows to the pressure existing in said tire, said hose including a metallic sheath, a housing cap mounted on said housing over said bellows and including a shelf, a radio wave generating circuit including a battery mounted on said shelf, a single pole, double-throw switch coupled mechanically to said bellows and having the poles thereof coupled electrically to said battery and said circuit, whereby expansion or contraction of said bellows may connect said battery to said circuit, and means coupling the output of said circuit to said sheath, whereby said sheath functions as an antenna.

9. In combination, a truck wheel having a pneumatic tire mounted thereon, and a radio transmitter comprising a housing mounted on the hub of said wheel, a pressure responsive member mounted in said housing, a tube connecting said member with the exterior of said housing, an air hose connecting said tube and the air valve of said tire for subjecting said member to the pressure existing in said tire, an antenna supported by said hose, a housing cap mounted on said housing over said member and including a shelf, a radio wave generating circuit including a battery mounted on said shelf, a switch coupled mechanically to said member and having the poles thereof coupled electrically to said battery and said circuit, whereby actuation of said member may connect said battery to said circuit, and means coupling the output of said circuit to said antenna.

10. In combination, a truck wheel having a pneumatic tire mounted thereon, and a radio transmitter comprising a housing mounted on said wheel, a pressure responsive member mounted in said housing, an air hose connecting said member and the air valve of said tire for subjecting said member to the pressure existing in said tire, said air hose including a metallic sheath, a radio wave generating circuit mounted in said housing, a pressure responsive means coupled mechanically to said member and coupled electrically to said circuit, whereby actuation of said member may actuate said circuit, and means coupling the output of said circuit to said sheath, whereby said sheath functions as an antenna.

References Cited in the file of this patent

UNITED STATES PATENTS

| | | |
|---|---|---|
| 983,861 | Pool | Feb. 7, 1911 |
| 1,415,820 | Eynon | May 9, 1922 |
| 2,669,876 | Lentz | Feb. 23, 1954 |
| 2,698,929 | Greacen et al. | Jan. 4, 1955 |
| 2,720,638 | Ritch | Oct. 11, 1955 |
| 2,727,221 | Sprigg | Dec. 13, 1955 |